United States Patent Office 3,609,983
Patented Oct. 5, 1971

3,609,983
KRYPTON-XENON RECOVERY SYSTEM AND PROCESS
Antony Lofredo, Springfield, and Francis J. Daly, Whitehouse Station, N.J., assignors to Air Reduction Company, Incorporated, New York, N.Y.
Filed May 16, 1968, Ser. No. 729,675
Int. Cl. F25j 3/02, 3/08
U.S. Cl. 62—22      18 Claims

ABSTRACT OF THE DISCLOSURE

A krypton-xenon mixture is recovered from the oxygen stream of an air separation plant in a gravity flow two-stage distillation process. Hydrocarbon contaminants are removed by adsorption and catalytic combustion, the resultant water and carbon dioxide being frozen out in heat exchangers. The final krypton-xenon product includes about 1 percent oxygen and about 0.15 percent hydrocarbon impurity.

BACKGROUND OF THE INVENTION

This relates in general to the recovery of rare gases and, more particularly krypton-xenon, from commercially pure liquid oxygen. Krypton and xenon are rare gases present in atmospheric air in very small percentages of the order of $1.1 \times 10^{-4}$ and $0.08 \times 10^{-4}$ percent by volume. Because of the small quantities of these gases, it has been difficult in the prior art to set up economically feasible systems for their separation from commercially pure liquid oxygen and, particularly, in such form that the product is substantially free from hydrocarbon impurities, more particularly acetylene and methane.

Accordingly, it is the object of the present invention to improve the techniques and apparatus for separating rare gases, more particularly krypton-xenon, from commercially pure oxygen derived from a conventional air separation system.

A more particular object of the invention is separation of krypton-xenon in a product which is substantially free from hydrocarbon impurities.

Another object is to minimize leakage and other losses in a krypton-xenon recovery system.

Another object is to provide a krypton-xenon separation system without auxiliary driving means.

A further object is to provide a krypton-xenon separation system in which the product can be obtained in either gaseous or liquid form.

BRIEF DESCRIPTION OF THE INVENTION

In accordance with the present invention, hydrocarbon contaminants are maintained at safe operating levels by adsorption and catalytic combustion. Water and carbon dioxide produced during catalytic combustion are removed in a set of freeze-out exchangers. The final product to be realized in accordance with the process of the present invention consists of a mixture of krypton-xenon, including less than 5 percent oxygen and only trace amounts of hydrocarbons and other impurities. A specific example has the following final analysis: 92 percent krypton, nearly 7 percent xenon, and as little as 1 percent oxygen, and 0.15 percent methane.

In an illustrative embodiment of the present invention liquid oxygen enriched to approximately 30 parts per million of krypton and 2.2 parts per million of xenon in the air separation plant, is pumped to the recovery unit of the present invention, through which it passes by gravity flow without additional pumping. It first passes through a pair of alternating silica gel adsorbers where acetylene and heavier molecular weight hydrocarbons are removed.

This stream then enters the primary distillation column where the first concentrations of the krypton-xenon fraction is made. Reboil for this column is produced by heat exchange with condensing gaseous nitrogen, also obtained from the air separation unit. A portion of the liquid nitrogen produced in the last operation is supplied to a condenser to provide reflux for the primary column. The reflux is set to recover better than 95 percent of the krypton fed to the column. At this reflux rate, approximately 50 percent of the methane in the column feed is returned to the air separation unit with the overhead oxygen stream.

The liquid accumulated in the bottom of this primary column contains the recoverable krypton and xenon, and hydrocarbon impurities. A small stream of this liquid, preferably less than one percent, is withdrawn and warmed to 600° F. in a heat exchanger combination. It is then heated to 900° F. in the electric heater before entering the catalytic combustion unit. Here, the hydrocarbons present are oxidized to carbon dioxide and water. The stream containing the latter returns through the same heat exchangers, where it is cooled by heat exchange with the small liquid stream withdrawn from the primary column. As the returning stream is cooled, its contained water and carbon dioxide are frozen out on the surfaces of the exchangers. Auxiliary filters retain any suspended carbon dioxide present in this process stream. The heat exchangers and filters are periodically alternated, the accumulated water and carbon dioxide being removed by heating them up. The temperature of the stream leaving the filters is controlled to prevent the xenon from freezing out along with the water and carbon dioxide.

The gaseous stream, purified of hydrocarbons, is then fed to the final distillation column. Reboil is provided by an electric heater, and reflux is obtained by condensing the vapor rising in the final column to liquid, in a heat exchange with a portion of liquid nitrogen which is vaporized in the process. The primarily-oxygen vapor leaving the top of the final column is returned to the primary column for recycling. Liquid product accumulated in the sump of final distillation column is periodically withdrawn into a liquid storage container. The product collected can be either warmed to ambient temperature and compressed into gaseous storage containers with a diaphragm compressor or removed as liquid product.

A particular feature of the system of the present invention is that the various component parts are physically so disposed that sufficient liquid head is provided to implement the required flow in the system, thereby eliminating the necessity for pumping equipment. This has the advantage of greatly reducing the losses due to leakage.

Another feature of the present invention, is the particular combination and configuration of the adsorption means and catalytic chambers for removing hydrocarbon impurities from the stream of krypton-xenon under concentration.

Other features of the present invention are the provision of electric and pneumatic control means for maintaining the stream passing into the second rectification column at a desired temperature to provide for freeze-out of the carbon dioxide impurity without removal of the xenon component. Additional features include electromechanical control means (1) for controlling the rate of the enriched liquid flow between the first and second rectification columns, (2) for controlling the flow of liquid nitrogen into the condensers atop the first and second columns in accordance with the level of, liquid-oxygen condensate in the respective condensers, (3) for controlling the return flow of nitrogen to the separation plant in accordance with the level of liquid in the sump of the first rectification column; and (4) for controlling the return flow of nitrogen from the condenser atop the second rectification column in accordance with temperature variations in the column operating in conjunction with a level controller.

These and other objects, features, and advantages will be apparent from a study of the specification hereinafter with reference to the drawings.

DETAILED DESCRIPTION OF THE DRAWINGS

Figure 1:
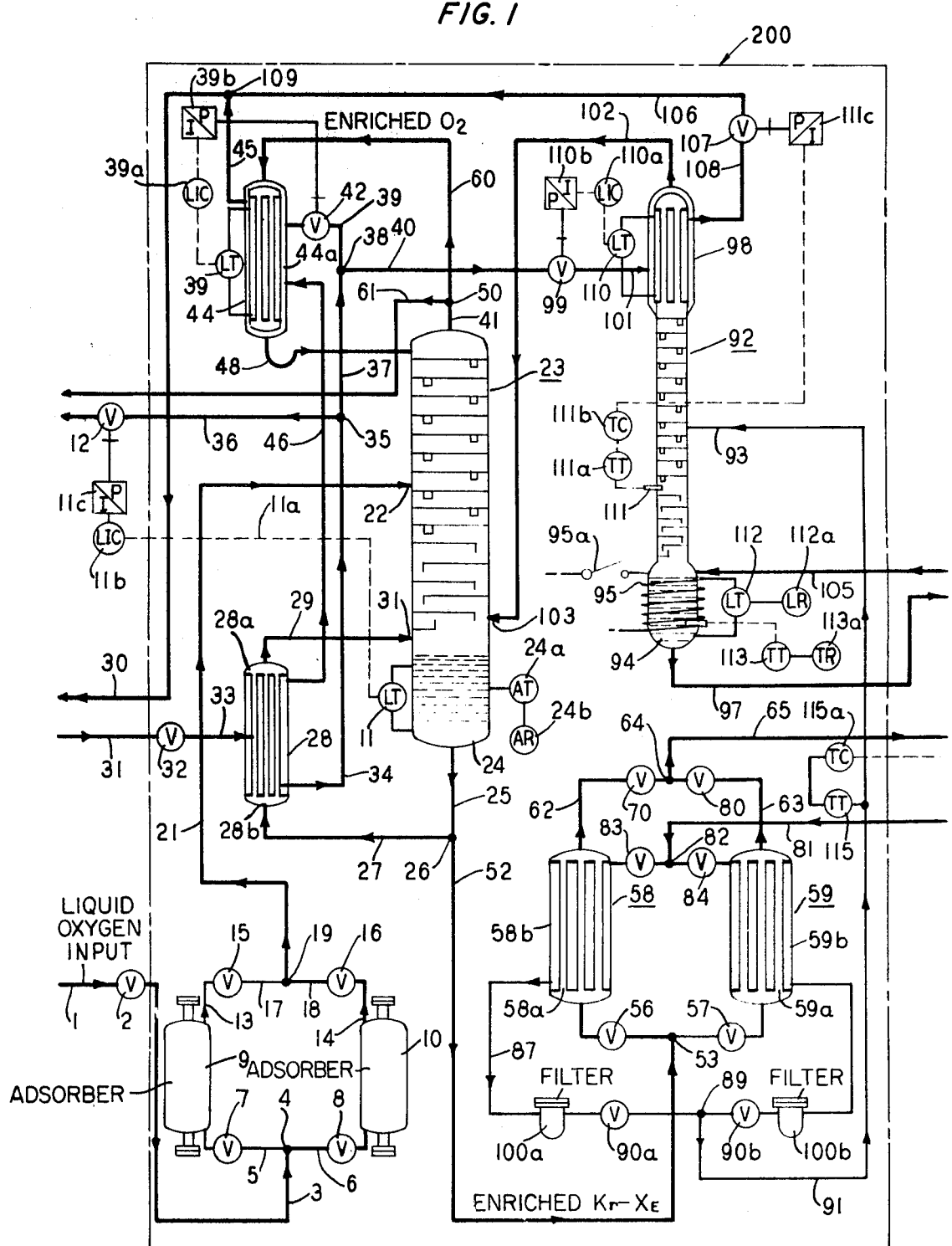
FIGS. 1 and 2, combined left to right, show in schematic an illustrative system in accordance with the present invention for the separation of krypton-xenon from liquid oxygen.

Referring to FIG. 1 of the drawings, liquid from an air separation system such as disclosed, for example, in United States Pat. 2,762,208 to Wolcott Dennis, issued Dec. 6, 1960, flows into the system of the present invention through the conduit 1, under control of a conventional cryogenic valve 2.

The feed-in stream is of commercially pure liquid oxygen of which the analysis is typically as follows:

| | Parts per million |
|---|---|
| Krypton | 30.2 |
| Xenon | 2.2 |
| Acetylene ($C_2H_2$) | 2.0 |
| Methane ($CH_4$) | 22.7 |
| Other hydrocarbon impurities | Trace |
| Oxygen (balance). | |

For convenience in designing systems in accordance with the present invention to process various volumes of mass flow, the mass-flow input to the illustrative system is based on that required to produce a product at the rate of one unit of mass flow, at the output end of the system. The designated units of mass flow are for the same specified period, say, per minute, or per hour, and are computed for a specified volume unit at 70° F. and one atmosphere absolute pressure. At the feed-in point, it will be assumed that liquid of the above analysis flows into the system at mass flow rate of 31,655 units. The temperature at the feed-in point is −288° F., and the pressure 34.1 pounds per square inch absolute.

The stream flows in through the conduit 3 to the junction 4, from which it may flow into either of the branches 5 or 6, depending on which pair of the conventional cryogenic valves 7, 15, or 8, 16 is open, the latter pairs being arranged for use in alternation. Assuming valves 7 and 15 are open, the stream passes through branch 5 and the adsorber 9, leaving by way of valve 15. The adsorbers 9 and 10 are of one of the types well known in the art, which employ, for example, silica gel, for the removal of hydrocarbon impurities. Units 9 and 10 function in alternation to adsorb from the entering stream all but about (0.01 part per million) of the heavy hydrocarbon molecules, particularly acetylene ($C_2H_2$), which tends to make operation of the rectification column more hazardous. After a period of operation within which adsorber 9 becomes substantially saturated with acetylene impurity, valves 7 and 15 are closed and valves 8 and 16 opened, interposing adsorber 10 in the path between junctions 4 and 19. Meanwhile, adsorber 9 is warmed to 350° F. with nitrogen to remove the adsorbed hydrocarbons and then cooled to operating temperature with an auxiliary stream of liquid oxygen to prepare it for subsequent reuse, in a manner well known in the art.

From the adsorber 9 (or 10, as the case may be) the partially purified stream from which all but about (0.01 part per million) of the acetylene has been removed, passes to the junction point 22 through the junction 19. At point 22, the mass flow measures 31,654 units, the temperature remains at approximately −288° F. and the pressure is 25 pounds per square inch absolute. The stream then passes through the conduit 21 and into the rectification column 23, which, in the present gravity flow embodiment, has the base mounted 16 feet above ground level.

Assuming the rectification column 23, which may take any of the forms well known in the art, is designed to have a total of 18 trays, the input point in the present example will be about at the level of the eighth tray, which in the present example is 10½ feet above the bottom of the tower. It will be understood that in the rectification column 23, the number of trays included, and the size and shape of the structure will be dictated by the fraction of krypton-xenon which it is desired to recover in the sump 24 at the base of the column. In the present column, it will be assumed that the concentration of krypton-xenon will be increased during rectification by a factor of 100 to 1. The enriched oxygen liquid, containing concentrated krypton-xenon, will be recovered in the sump 24, and the balance of vapor consisting of about 37,984.2 units of mass flow, principally of oxygen containing 8.85 parts per million of methane, and 1.405 parts per million of krypton, will flow from vent 41, at a temperature of −289° F. and a pressure of 24.7 pounds per square inch absolute. In the column 23, in the present example, the liquid-to-vapor ratio near the top approximates 0.16, whereas, near the bottom of the column it rises to about unity. Near the top of the column, the pressure is about 24.7 pounds per square inch absolute, rising at the liquid level in the sump to about 24.8 pounds per square inch absolute.

After the liquid from the insert point 22 has filtered down through the trays of the rectification column 23, in interchange with rising oxygen vapor, concentrated liquid collects in the sump 24, of which the approximate analysis is as follows:

| | Parts per million |
|---|---|
| Krypton | 3315.00 |
| Xenon | 220.00 |
| Hydrocarbon impurities (including principally methane) | 1535.00 |
| Balance, oxygen. | |

Liquid drawn off from the sump 24 passes out through the conduit 25 to the junction 26 at a mass flow rate of 32,271.3 units, at a temperature of −284.5° F. and a pressure of 30 pounds per square inch absolute. From the junction 26, more than 99 percent of the flow is returned to the column 23 through reboiler 28, where the enriched liquid oxygen is reduced in temperature from −284.5° F. to −287° F., expanding from an absolute pressure of 30 to 25.5 pounds per inch during a heat exchange with nitrogen vapor, which is liquefied in the process. The auxiliary nitrogen cycle utilizes gas from the air separation unit in a manner which will be described in detail hereinafter. The reboiled concentrate containing oxygen and krypton-xenon, of which 4166.67 units of mass flow are liquid and 83.33 are vapor, passes into the column 23 from point 31, adding to the liquid bath in the sump 24. The liquid in the sump 24 is monitored by a liquid level transmitter 11, designated LT, which may be of any of the types well known in the art, such as described, for example, beginning on page 243, Sect. 7.19, Chapter VII of Cryogenic Engineering by Russell B. Scott, D. Van Nostrand Co., 1959. The response of the liquid level transmitter 11 operates an electrical level indicating control circuit 11b designated LIC, which is connected to electromechanical transducing means 11c, designated I/P, to indicate current-pneumatic control. This may include, for example, a solenoid, or equivalent means, for converting electrical impuses derived from level transmitter 11 to operate extended-bonnet valve 12, which controls the size of the nitrogen stream returning from junction 35 to the air separation plant, in accordance with the liquid level in sump 24. A chromatograph 24a, designated AT, to indicate analysis transmitter, may be of any well-known type which functions to analyze the hydrocarbon and ozone content of liquid in sump 24, recording the results of the analysis on the analysis recorder 24b, designated AR. It is contemplated, in the present example, that the level of liquid in sump 24 should be maintained at 18 inches, which, in combination with the raised position of the column 23, based 17 feet above ground level, supplies a sufficient head for the gravity flow system.

Assuming that 37,984.2 mass flow units of gaseous oxygen pass out through the vent 41 at a pressure of 24.7 pounds per square inch absolute and a temperature of −289° F., 31,653.4 units of mass flow return to the air separation unit through conduit 61, and the remaining 6330.8 mass flow units return through the conduit 60 to the heat exchanging condenser 44 at a temperature of −289° F. In conduit 61, the returning oxygen stream carries off 8.85 parts per million of methane and 1.405 parts per million of krypton.

In condenser 44, the oxygen vapor, bearing a krypton-xenon fraction, is reconverted to liquid and passes out of the condenser through the conduit 48, re-entering the column 23 near the top at a temperature of −289° F., a pressure of 24.7 pounds per square inch absolute, and at a mass flow rate of approximately 6323.3 units. From this point, the liquid trickles down through the plates in countercurrent with rising vapor, and augmenting the bath in sump 24.

Figure 2:
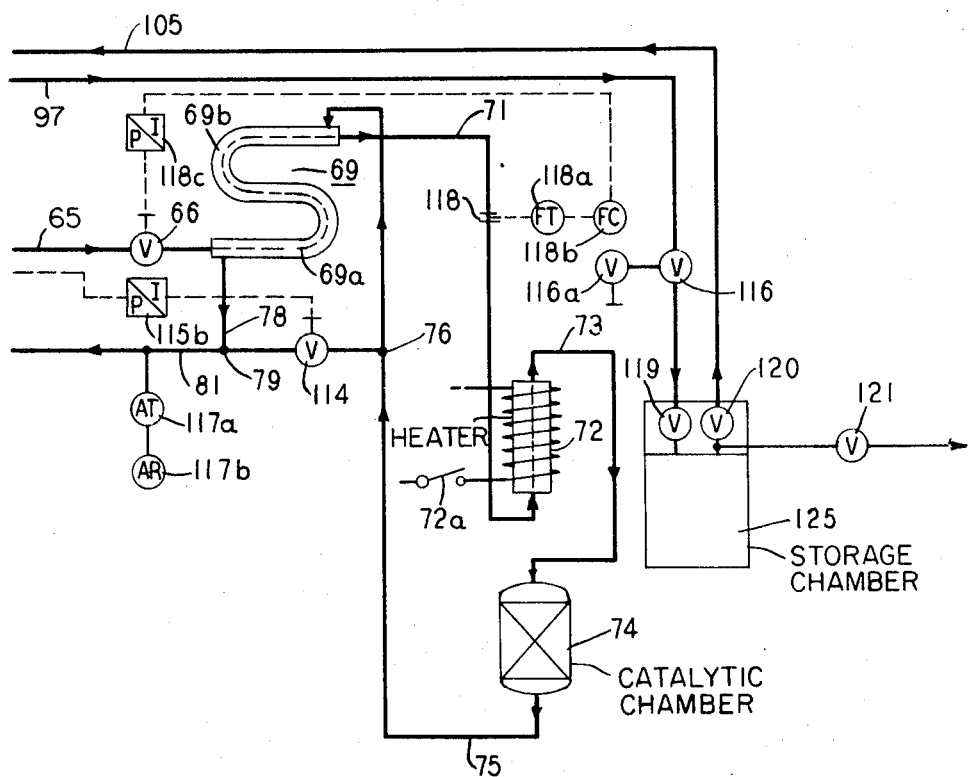

From the junction point 26, below the sump 24, the stream of enriched liquid oxygen, at a temperature of −282.5° F. and a pressure of 33 pounds per square inch absolute, passes through the conduit 52 to the junction 53 at a mass flow rate of 316.5 units, bearing krypton and xenon contents of 33.15 and 220 parts per million, respectively. At junction 53 the stream is passed through either one of heat exchangers 58 or 59, depending on which pair of valves 56 and 70 or 57 and 80, is operated. Heat exchangers 58 and 59 are operated in alternation, each until it becomes clogged with impurity deposits on the cold shell side of the exchanger, as will be explained hereinafter. Heat exchangers 58 and 59 may assume any of the forms well known in the art, such as, for example, a multiple tube heat exchanger of the general type disclosed in FIG. 2.11 on page 21 of Cryogenic Engineering, supra. The cold liquid stream passes into the respective inner tube 58a (59a), where it is vaporized and heated up to a temperature of −149° F. in a heat exchange with the returning warm stream. The vaporized stream leaves the respective heat exchanger at a slightly reduced pressure of 32.5 pounds per square inch absolute, by the respective vent 62 or 63, through the respective valve 70 or 80, arriving at the junction 64. From junction 64 the vapor stream passes through the conduit 65 under control of the flow-controlled-valve 66 to the inner tube 69a of heat exchanger 69, which may be what is known in the art as a finn-tube type. Valve 66 is pneumatically controlled by an electromechanical transducing means, comprising a current-pneumatic circuit 118c. The latter receives signals from a flow-control circuit 118b connected to orifice plate 118, interposed in the path leading from inner tube 69a of heat exchanger 69. The flow controller 118b is manually adjustable to a desired pre-set flow. When this flow is exceeded, the signal derived from circuit 118b is transmitted to an electromechanical transducing system 118c, which responds, to control the operation of valve 66, to keep the flow regulated at the pre-set level. The stream passes through the inner tube 69a of heat exchanger 69 where it is warmed from −149° F. to +562° F. at a very slight drop in pressure.

The fluid stream leaves the inner-tube 69a of heat exchanger 69, passing through the conduit 71, and into the heater 72, where it is heated up to 900° F. The latter is a conventional electrical resistance heating coil which is thermostatically controlled to maintain a desired temperature by means of a circuit (not shown) connected through switch 72a. From the heater 72, the vapor stream flows through conduit 73 into a catalytic reaction chamber 74. This may assume any of the forms well known in the art; and may include, for example, a reaction vessel charged with pellets of a suitable catalyst, such as, for example, comminuted platinum or platinum-coated alumina pellets. As the vapor stream passes through the reaction chamber, it undergoes another temperature rise of about 100 degrees and a pressure drop of less than 0.1 pound per square inch emerging at a temperature of 1000° F. and a pressure of about 25 pounds per square inch absolute. In the present illustration, the stream entering the catalytic chamber at a mass flow rate of 316.5 units, has the following analysis:

| | Parts per million (by volume) |
|---|---|
| Krypton (Kr) | 3315 |
| Xenon (Xe) | 220 |
| Methane ($CH_4$) | 1300 |
| Ethane ($C_2H_6$) | 154 |
| Ethylene ($C_2H_4$) | 4 |
| Acetylene ($C_2H_2$) | 1 |
| Propylene ($C_3H_6$) | 4 |
| Propane ($C_3H_8$) | 39 |
| n-Butane ($C_4H_{10}$) | 23 |
| i-Butane ($C_4H_{10}$) | 10 |
| Oxygen ($O_2$) Balance. | |

During the catalysis, the major portion of the hydrocarbons are oxidized and thereby converted into carbon dioxide and water vapor. Analysis of the emergent stream is as follows:

| | Parts per million (by volume) |
|---|---|
| Water Vapor ($H_2O$) | 7050 |
| Carbon Dioxide ($CO_2$) | 3680 |
| Methane ($CH_4$) | 50 |
| Krypton (Kr) [1] | 3315 |
| Xenon (Xe) [1] | 220 |
| Oxygen ($O_2$) Balance. | |

[1] Remained substantially unchanged.

The stream bearing these components passes through conduit 75 and junction 76 and enters the outer tube 69b of the finn-tube heat exchanger 69 where the temperature is reduced in the course through the heat exchanger to about 289° F. The reduced temperature stream passes out of the heat exchanger tube 69b, through the conduit 78 to the junction 79. A portion of the stream returning from the catalytic chamber 74 may be made to by-pass heat exchanger 69, passing directly from junction 76 to junction 79 under control of valve 114. The latter is electrically or pneumatically controlled by system 115b through a conventional temperature control circuit 115a responsive to a signal from thermal transmitter 115 located in conduit 91, which leads from junction 89 to a point 93 partway up in the second rectification column 92. The function of temperature controlled valve 114 is to control the ultimate temperature of the stream flowing in conduit 91, by permitting a higher or lower proportion of the hot returning stream from chamber 74 to by-pass heat exchanger 69.

The bulk of the stream from the junction 79 passes through the conduit 81 to the junction 82. An analysis transmitter 117a, which may be of the flame ionization type, tests the residual hydrocarbon content of the passing stream, and continuously records the findings on conventional recording means 117b. From junction 82, the stream returns through the outer chambers 58b or 59b, of one or the other of the multiple-tube heat exchangers 58 or 59, depending on whether valve 83 and 90a or 84 and 90b is operated. Assuming that the former valve pair is operated, and heat exchanger 58 is in operation, the vapor stream passes through the outer tube 58b, where the temperature is reduced from +289° F. to −260° F. with a slight decrease in pressure.

As previously explained, the function of the heat exchanger is to freeze out the water vapor and carbon dioxide carried in the stream from the catalytic reducing chamber 74, on the cold inner tubes of the exchanger. Each of the heat exchangers 58, 59 is designed to operate satisfactorily for this purpose for a period of several days. During the alternate periods, while the heat exchangers 58 and 59 are out of the main stream, the solidified carbon dioxide and ice, which has frozen on the inner tubes, is purged by streams of warm gas in a manner well known in the art.

Assuming heat exchanger 58 is operational, the purified stream leaves through conduit 87 at a temperature of −260° F. and passes through the particulate filter 100a, which comprises a body of sintered metal of a form well known in the art, for filtering out any remaining solid particles from the stream. As pointed out hereinbefore, the temperature of the stream flowing in conduit 91 is automatically controlled by temperature controlled valve 114 which opens a by-pass to heat exchanger 69 in the path of the stream returning from catalytic chamber 74. The reason for the careful temperature control of the stream flowing in conduit 91 is primarily to maintain the temperature in the heat exchangers 58, 59 above the freezing temperature of xenon and below that of carbon dioxide so that the xenon does not freeze out in the heat exchanger.

When heat exchanger 58 is first switched into operation, there are no solid impurities deposited on the shell side 58b, in which case the pressure drop across valve 66 is 7.41 pounds per square inch. As the deposit accumulates during operation of freeze-out exchanger 58, the pressure drop across valve 66 gradually drops, approaching zero. When the latter condition is approximated, exchangers 58 and 59 are switches, and the process is repeated.

The purified stream containing less than 3 parts per million carbon dioxide, passes from junction 89 through the conduit 91 and into the auxiliary rectification column 92 at a level, say, above the twelfth tray, at a temperature of −260° F., a pressure of 25.5 pounds per square inch absolute, and flowing at a mass flow rate of 316.5 units.

Column 92, which is about 18 feet high and is based 20 feet above the ground, may assume a form generally similar to that of the rectification column 23 described hereinbefore, with the exception that the diameter is proportionately smaller due to the reduced volume of gas, which is only about 1/300 as great as the volume accommodated in the latter. Column 92, which in the present illustrative embodiment ranges in pressure from about 25.5 pounds per square inch absolute near the top to 25.6 pounds per square inch absolute near the liquid level in the sump 94, over a temperature range of from −287° F. near the top to −242° F. near the liquid level. The liquid-to-vapor ratio near the top is about 50 percent, changing to unity near the bottom. The concentration of the krypton-xenon fraction achieved in the liquid residue in the sump 94 is of the order of 300 to one.

The stream passes into the column 92 through intake 93, the vapor portion comprising mostly low boiling oxygen rising to the condenser 98 at the top of the column, and the liquid fraction comprising a high concentration of krypton-xenon passing down through the column and becoming increasingly concentrated, collecting in the sump 24. A conventional high resistance heating coil 95 envelopes the sump tank 94 which serves to continuously reboil the liquid in the bath, maintaining it at a temperature of about −242° F. and a pressure of 25.6 pounds per square inch absolute. A thermal transmitter 113 interposed in a thermowell in the bath is connected to recording means 113a. In addition, the liquid level is monitored in a conventional manner by the level transmitter 112, connected to recording means 112a.

The oxygen remaining in the sump 94 is at a concentration of 5 percent or lower, the balance being krypton-xenon. In the example under description, analysis of the liquid in the sump 94 is as follows:

| | Percent by volume |
|---|---|
| Krypton | 92.15 |
| Xenon | 6.7 |
| Oxygen | 1.0 |
| Hydrocarbons (principally methane) | .15 |

The vapor, comprising primarily oxygen, rises to the top of column 92, roughly half, 315.3 units of mass flow, passing out through the conduit 102 at a temperature of −287° F. and a pressure of 25.5 pounds per square inch absolute, and returning to column 23 at point 103 fairly near the lower end where the liquid-to-vapor ratio is nearly unity. The incoming oxygen vapor, including 431 parts per million of krypton, repeats the cycle through column 23. The remaining portion of oxygen vapor which rises to the top of column 92, constituting 316.5 units of mass flow, is condensed to liquid, returning down through the trays to the sump 24 in countercurrent with rising vapor. The liquid accumulation in the sump 24 of column 92 is allowed to gradually build up, and is periodically drawn off to storage container 125. The rate at which the liquid accumulates, and hence, the composition of the final product, is determined by a dual control system operating on valves 99 and 107 which respectively control the nitrogen intake and exhaust to condenser 98. This system controls the back pressuring of boiling nitrogen in the condenser 98, thereby causing more or less of the enriched vapor rising in the column 92 to be condensed. The functioning of this system will be described in greater detail hereinafter with reference to the auxiliary nitrogen system.

The liquid product is periodically drawn off through the conduit 97 under control of valve 116, manually operated through control circuit 116a. The temperature is −242° F. and the pressure is 25.6 pounds per square inch absolute. Before passing into the liquid storage cylinder 125, where it is accumulated at the rate of one unit of mass flow, the stream passes through the valve 119, by gravity flow. Valve 116 is designed to take the pressure drop due to the elevation of column 92. Flash vapor from the tank 125 is returned through valve 120 at a pressure of 24.9 pounds per square inch absolute, at a flow rate of 0.25 unit through the conduit 105 to the top of the sump tank 94 for reprocessing in the rectification column 92.

Referring now to the nitrogen cycle which supports the principal oxygen-krypton-xenon cycle, a stream of gaseous nitrogen which may be derived from the same air separation unit from which the input oxygen stream is derived, passes in through the conduit 31 and the valve 32 at a temperature of −283° F. and a pressure of 98.7 pounds per square inch absolute, entering through the intake 33 into the outer tubes 28a of a conventional reboiler 28 where, in a heat exchange with enriched liquid oxygen recirculated from the sump 24 of column 23, the nitrogen is liquefied. Conduit 46 carries a nitrogen stream including impurity gases, such as neon and helium, which do not readily condense in condenser 28, to the outer tubes 44a of condenser 44, where it eventually joins the nitrogen vapor passing out through conduit 45 to junction 109.

The principal liquid nitrogen stream passes out of condenser 28 through the conduit 34 and into junction 35, from which about 82 percent of the flow passes out through conduit 36 at a temperature of −283° F. and a pressure of 98.7 pounds per square inch absolute for return to the liquid nitrogen stream of the air separation unit under control of valve 12, which opens and closes as a function of the liquid level of enriched oxygen in the sump 24 of column 23 as previously described.

The balance of the principal liquid nitrogen stream passes from the junction 35 through the conduit 37 to another junction 38, where it again separates into two components, 95.2 percent passing through the branch 39 under control of the valve 42 into the condenser 44, and the remaining 4.8 percent passing through the branch 40 under control of the valve 99 into the condenser 98. The fluid nitrogen passing into each of these condensers, which is a little more than 13 percent vapor, is at a temperature of 44.8 pounds per square inch absolute, and a temperature of −301° F. Valves 42 and 99 are respectively electrically or pneumatically controlled in response to liquid levels in the respective condensers 44 and 98. Valve 42 responds to signals from the level transmitter 39, which pass through the liquid level control circuit 39a and the current-pneumatic transducer 39b. Valve 99 responds in a similar manner to the signals of the level transmitter 110, through control means 110a and 110b.

In the condenser 44, the liquid nitrogen is entirely vaporized in a heat exchange with condensing oxygen which passes down through the outer tubes of the condenser and out through the conduit 48 as liquid. The nitrogen vapor passes out through the conduit 45 at a temperature of −301° F. and a pressure of 44.8 pounds per square inch absolute, to the junction 109, from which it returns to the gaseous nitrogen stream of the air separation plant through the conduit 30.

In the condenser 98, the stream of liquid nitrogen is converted to 100 percent vapor in a heat exchange with enriched oxygen vapor bearing traces of krypton-xenon, which rises in the column 92. The nitrogen vapor passes out of the column through the conduit 106 at a temperature of −301° F. and a pressure of 44.8 pounds per square inch absolute. The flow of nitrogen gas passing through conduit 106 is controlled by the valve 107, which is in turn controlled by conventional means, either pneumatically or electronically or the combination, in response to changes in temperature in the rectification column 92. Temperature changes are monitored by thermal element 111 disposed in a thermal well in the column 92 at a level above the 2nd tray. The electrical impulses from the thermal element 111 are transmitted through a bridge-type circuit 111a and control circuit 111b to the current-pneumatic transducing means 111c for operation of the valve 107.

As previously pointed out, the dual control system consisting of the valves 99 and 107, and their respective electro-pneumatic control circuits determine the pressure-differential across the outer shell of condenser 98, and hence the pressure and temperature at which liquid nitrogen boils in condenser 98. This, in turn, determines the rate at which the enriched vapor rising in column 92 is condensed, and hence, the composition of the final product which condenses in the sump 94.

From the valve 107 the nitrogen vapor passes through the conduit 106 to the junction 109, returning to the air separation column through the conduit 30 as previously described with reference to gas from conduit 45.

It will be understood that all of the low temperature apparatus, including, for example, the adsorbers 9 and 10, reboiler 28, the primary column and secondary columns and associated condensers, and the switch heat exchangers 58 and 59, together with the conduits immediately adjacent to these structures, are enclosed for insulation purposes in a jacket or cold box 200 which comprises, for example, a steel box suitably lined with insulation. The conduits and other components of the cryogenic system are suitably designed to withstand the temperatures and pressures anticipated for the system. It will be understood that the system in operation contains numerous temperature, pressure, and flow indicators, safety valves and other service outlets of conventional construction, which have been omitted to simplify the description.

Although the present illustrative method and apparatus have been described in detail with reference to a specific system and method of operation, utilizing components of specific size and design, it will be understood by those skilled in the art that the present invention is not necessarily limited to the specific form disclosed herein by way of example, but that the scope of the present invention is encompassed in the appended claims.

We claim:
1. The method of separating out a mixture of krypton-xenon from a stream of liquid oxygen in a separate recovery circuit which comprises the steps of:
   passing said liquid stream through hydrocarbon adsorbing means for removing at least a portion of the hydrocarbon impurities present in said stream,
   passing said stream into a first rectification column at a position part-way up in said column whereby said liquid filters down through said column in countercurrent with rising vapor comprising primarily oxygen to produce a first concentration of said krypton-xenon fraction forming an enriched mixture including a substantial balance of liquid oxygen in the sump of said first rectification column,
   supplying in a separate cycle a stream of gas from a source of nitrogen,
   reboiling a major portion of said enriched mixture liquid from the sump of said first column by heat exchange with said nitrogen stream and thereby converting at least part of said nitrogen stream to liquid and recirculating said reboiled portion in said first column,
   condensing a portion of the said vapor from the top of said first rectification column by heat exchange with a portion of said liquid nitrogen stream and further circulating said condensed portion in said first column,
   passing enriched mixture liquid from said sump through heat exchanger means to convert said enriched mixture liquid to a stream of enriched mixture vapor at an elevated temperature,
   catalyzing said stream of enriched mixture vapor at said elevated temperature for oxidizing a substantial portion of the remaining hydrocarbon impurities in said enriched mixture vapor stream,
   returning said enriched mixture vapor stream to said heat exchanger means for cooling said stream to near its liquefaction temperature and for freezing said oxidized impurities from said stream,
   passing the cooled purified enriched mixture stream through particulate filtering means to remove solidified impurities,
   introducing said cooled purified enriched mixture stream at a point part-way up in a second rectification column whereby condensate filters down through said column in countercurrent with rising vapor comprising primarily oxygen,
   further concentrating the krypton-xenon fraction to form a concentrated liquid in the sump of said second rectification column,
   condensing at least a portion of the primarily oxygen vapor rising in said second column by heat exchange with a portion of the liquid nitrogen stream and refluxing said second column with said last mentioned condensed portion,
   returning the remainder of said vapor to a point part-way up in said first rectification column for recirculation in said first column,
   reboiling said concentrated liquid in the sump of said second rectification column,
   drawing off concentrated krypton-xenon product from said second column as desired.
2. The method in accordance with claim 1, which comprises the steps of:
   returning a portion of said liquid nitrogen stream to the said nitrogen source, and
   returning the nitrogen gas formed in said heat exchanges to said nitrogen source.
3. The method in accordance with claim 1, wherein said hydrocarbon adsorbing means remove hydrocarbons of relatively heavy molecular weight comprising primarily acetylene.
4. The method in accordance with claim 1, wherein the product of said catalyzing step is primarily carbon dioxide and water vapor, and wherein a major portion of said carbon dioxide and water vapor are frozen out on said heat exchanger means.

5. The method in accordance with claim 4, wherein the temperature of the enriched mixture vapor stream returning to said heat exchanger means from said catalyzing step is maintained at a temperature in said heat exchanger means which is substantially below the freezing temperature of carbon dioxide but above the freezing temperature of xenon.

6. The method in accordance with claim 1, wherein the liquid-to-vapor ratio in said first rectification column varies from 10 to 50 percent near the top to approximately unity near the liquid level, and in said second column varies from 10 to 60 percent near the top to approximately unity near the liquid level.

7. The method in accordance with claim 1 wherein the said stream in said separate recovery circuit is provided with a sufficient liquid head whereby said stream is propelled through said system by gravity only.

8. A system for separating out a mixture of krypton-xenon from a stream of oxygen which comprises in combination:
a source of a stream of liquid oxygen,
hydrocarbon adsorbing means connected to said source to receive said liquid stream,
means including a first rectification column connected to receive the output liquid stream of said hydrocarbon adsorbing means at a point part-way up in said first column whereby said liquid filters down through said column in countercurrent with rising vapor comprising primarily oxygen to produce a first concentration of said krypton-xenon fraction forming an enriched liquid in the sump of said first column,
a source of a stream of nitrogen gas,
means for reboiling and recirculating enriched mixture liquid from the sump of said first column by heat exchange with said stream of nitrogen gas thereby condensing at least part of said gas to form a liquid nitrogen stream,
means for condensing a portion of said vapor at the top of said first rectification column by heat exchange with a portion of said liquid nitrogen stream,
heat exchanger means connected to receive enriched liquid from the sump of said first column to at least partially convert said enriched liquid mixture to vapor at an elevated temperature,
means comprising a catalytic chamber connected to receive the warmed output stream from said heat exchanger means for oxidizing the impurities in said stream to carbon dioxide and water vapor,
means directing the output of said catalytic chamber to said heat exchanger means for freezing out the said impurities in said heat exchanger means,
particulate filtering means for removing solidified particles remaining in said stream,
a second rectification column,
means directing said filtered stream to a point part way up in said second rectification column,
means for condensing a portion of the vapor rising in said column by heat exchange with a portion of the liquid nitrogen stream,
and means for collecting and storing the product of said second rectification column.

9. A system in accordance with claim 8 further comprising
means including valve means for returning the nitrogen gas formed in said condensing means to said source.

10. A system in accordance with claim 8 wherein sufficient pressure head is maintained in the main stream of said krypton-xenon separation system ahead of said storage means for continuously urging said stream including said mixture of krypton and xenon along a path leading to said collecting and storage means without the aid of mechanical impelling means interposed in said krypton-xenon separation system.

11. The combination in accordance with claim 9 including electromechanical means for monitoring the level of said enriched liquid in the sump of said first rectification column, and for utilizing a signal which is a function of the level of said liquid to control said valve means for regulating the return of said stream of nitrogen to said nitrogen source.

12. The combination in accordance with claim 8 wherein the liquid-to-vapor ratio near the top of said first rectification column is about 10–50 percent, and rises to about unity near the liquid level in the sump of said column, and in said second column varies from 10–60 percent near the top, and rises to about unity near the liquid level in the sump of said column.

13. The combination in accordance with claim 8 which includes electromechanical means for controlling the volume of flow between the sump of said first rectification column and the input to said second rectification column to a preselected value about one percent of the liquid drawn from said sump.

14. The combination in accordance with claim 9 which includes a means responsive to the liquid level of vapor-condensate in the condensing means associated with each of said rectification columns, valve means interposed in the liquid nitrogen intake path to each of said condensing means, and electromechanical servo means connected between each of said liquid level responsive means and said valve means for controlling the liquid nitrogen intake into each of said condensing means in accordance with the level of the liquid-condensate therein.

15. The combination in accordance with claim 9 which includes a thermally responsive element interposed at a point part-way up in said second rectification column, and electromechanical servo means connected to said thermally responsive element to control valve means in the path of nitrogen gas returning to said source of nitrogen from condenser means associated with said second column, for regulating the pressure differential in said nitrogen stream traversing said condensing means, thereby to regulate the rate at which said liquid product collects in the sump of said second rectification column.

16. The combination in accordance with claim 8 wherein said hydrocarbon adsorbing means comprises primarily silica gel.

17. The combination in accordance with claim 8 wherein said catalytic chamber includes a particulate bed comprising platinum.

18. A system for separating out a mixture of krypton-xenon from a stream of oxygen which comprises in combination:
a source of a stream of liquid oxygen,
hydrocarbon adsorbing means connected to said source to receive said liquid stream,
means including a first rectification column connected to receive the output liquid stream of said hydrocarbon adsorbing means at a point part-way up in said first column whereby said liquid filters down through said column in countercurrent with rising vapor comprising primarily oxygen to produce a first concentration of said krypton-xenon fraction forming an enriched liquid in the sump of said first column,
an external source of cooling medium for condensing a portion of said vapor at the top of said first rectification column,
means connected to said external source for reboiling and recirculating enriched mixture liquid from the sump of said first column,
heat exchanger means connected to receive enriched liquid from the sump of said first column to at least partially convert said enriched liquid mixture to vapor at an elevated temperature,
means comprising a catalytic chamber connected to receive the warmed output stream from said heat exchanger means for oxidizing the impurities in said stream to carbon dioxide and water vapor, means directing the output of said catalytic chamber to said heat exchanger means for freezing out the said impurities in said heat exchanger means, particulate filtering means for removing solidified particles remaining in said stream, a second rectification column, means directing said filtered stream to a point part-way up in said second rectification column, means connected to said external source for condensing a portion of the vapor rising in said second column to liquid which trickles down to the sump in countercurrent with rising vapor, means for collecting and storing the product of said second rectification column, and electromechanical means for controlling the flow rate of the stream returning through said heat exchanger means for maintaining the stream temperature below the freezing point of carbon dioxide and above the freezing point of xenon.

References Cited

UNITED STATES PATENTS

| | | | |
|---|---|---|---|
| 2,840,994 | 7/1958 | Lobo | 62—18 |
| 2,962,868 | 12/1960 | Dennis | 62—22 |
| 3,037,359 | 6/1962 | Knapp | 62—22 |
| 3,191,393 | 6/1965 | Dennis | 62—22 |
| 3,363,427 | 1/1968 | Blanchard | 62—40 |

NORMAN YUDKOFF, Primary Examiner

A. F. PURCELL, Assistant Examiner

U.S. Cl. X.R.

62—12, 18, 29, 31, 21

UNITED STATES PATENT OFFICE
CERTIFICATE OF CORRECTION

Patent No. 3,609,983          Dated October 5, 1971

Inventor(s) ANTONY LOFREDO and FRANCIS J. DALY

It is certified that error appears in the above-identified patent and that said Letters Patent are hereby corrected as shown below:

Column 2, line 2, "concentrations" should read --concentration--

Column 3, line 42, "at" should read --a--.

Column 4, line 68, "impuses" should read --impulses--.

Column 5, line 32, "33.15" should read --3315--.

Column 9, line 2, "temperature" should read --pressure--.

Column 12, line 26, before "valve" --further-- should be added.

Column 12, line 30, before "valve" --further-- should be added.

Signed and sealed this 23rd day of May 1972.

(SEAL)
Attest:

EDWARD M. FLETCHER, JR.          ROBERT GOTTSCHALK
Attesting Officer          Commissioner of Patents